Inventor
Wolfgang Ohligs
By his attorneys
Howson and Howson

July 13, 1965  W. OHLIGS  3,194,171
FLUID DRIVE MEANS
Filed Nov. 14, 1962  3 Sheets-Sheet 2

Inventor
Wolfgang Ohligs
By his attorneys
Howson and Howson.

United States Patent Office 3,194,171
Patented July 13, 1965

3,194,171
FLUID DRIVE MEANS
Wolfgang Ohligs, Rheydt-Giesenkirchen, Germany, assignor to Mannesmann-Meer Aktiengesellschaft, Monchen-Gladbach, Germany, a German company
Filed Nov. 14, 1962, Ser. No. 237,597
7 Claims. (Cl. 103—161)

This invention relates to fluid drive means and more particularly to rotary fluid drive means suitable for use as a fluid motor and as a fluid pump. The device can be used by itself as a pump or as a motor. Two such devices may also be used together as a drive unit. More specifically, the invention relates to a known type of fluid drive means of having a rotating cylinder block and regulatable stroke pistons adapted to reciprocate in cylinders within the block.

In such devices as designed hitherto, regulation of the piston stroke is obtained by setting a disk at an oblique angle to the axis of the cylinder block. As the cylinder block rotates, openings to conduits connected to the individual cylinders pass sequentially over stationary valve ports for the induction and expulsion of fluid.

The magnitudes of the reaction forces, characteristic of such drive means using a fluid under pressure are large. Because fluid operating pressure varies with the instantaneous load, and because fluid viscosity is affected by the instantaneous opearting temperature, it is very difficult to make the device run perfectly. It is hard, for example, to control the thickness of the fluid film in the bearings and particularly between certain control surfaces. The thickness of these fluid films is also dependent on the factors mentioned above. The magnitudes of these effects can advantageously be diminished by load-relieving design techniques thereby increasing efficiency and machine life.

The fundamental object of the present invention is to provide a device of the class described which operates with a minimum of stress and friction, is reliable in its operation and simple in its construction so that it can be manufactured economically on a large scale, and in which the advantages and drawbacks of various design details are carefully reconciled to obtain optimum utility in its technical and economic aspects.

A further purpose of the invention is to provide a device of the class described in which the pistons are free from non-axial tilting pressures.

A further purpose of the invention is to provide fluid drive means of the class described having linear adjustability of the piston stroke with the drive shaft and a main control surface at separated fixed positions.

Still another object of the invention is to provide automatic adjustment of the thickness of fluid films between surfaces moving relatively to one another.

To accomplish these and other objectives the invention provides a fluid drive means suitable for use as a fluid motor and as a fluid pump, comprising a housing and a block each having a central axis, said housing having a central cavity with inner walls arranged in a generally conical pattern, said block being positioned adjacent to said cavity and having a plurality of cylinders formed therein, each of said cylinders having a longitudinal axis substantially perpendicular to an inner wall of said cavity, a piston in each of said cylinders, each of said pistons having a head with a flat bearing surface adapted to contact an inner wall of said cavity, the axes of said housing and said block being offset with respect to one another, means for rotating said housing and said block about their central axes and adjusting means for causing relative movement between the housing and the block in a direction perpendicular to their central axes.

In a particular embodiment of the flat inner walls these walls are at the bottom of cylindrical recesses in the housing. That is to say, they are flat, circular in shape, larger than their associated piston heads in size, and have cylindrical sides at their edges extending perpendicularly from said walls each in a direction toward their associated pistons, there being sufficient surface on said walls for the piston heads to slide laterally on as needed. This form of construction is obtained advantageously through boring and/or milling, the inner walls into the housing.

In a first form of construction the housing is fastened to a drive shaft that is mounted in a fixed location in the casing of the device, while the cylinder block, which is rotatable in an adjusting contrivance, can be shifted along the centerline of a web or bridge between control openings or valve ports in a main control surface.

In a second form of construction the cylinder block is fastened to the drive shaft, both being rotatably mounted in a fixed location in the casing, while the housing, which surrounds but is not attached to the drive shaft, is mounted so that it is free to turn in an adjusting mechanism that can be adjusted eccentrically to the drive shaft.

A further particular characteristic of the first form of construction referred to above is that there is provided, between the cylinder block and the housing, a mobile bearing that is subjected to the action of fluid under pressure. This form of construction can be such that the bearing is capable of limited movement in a direction parallel to the shaft and cylinder block axes. It supports the cylinder block and housing relatively to one another.

The foregoing and other objects and novel aspects of the invention will become apparent upon a consideration of the claims, the following description, and drawings.

In the drawings two forms of construction of a device in accordance with the invention are shown.

Figure 1:
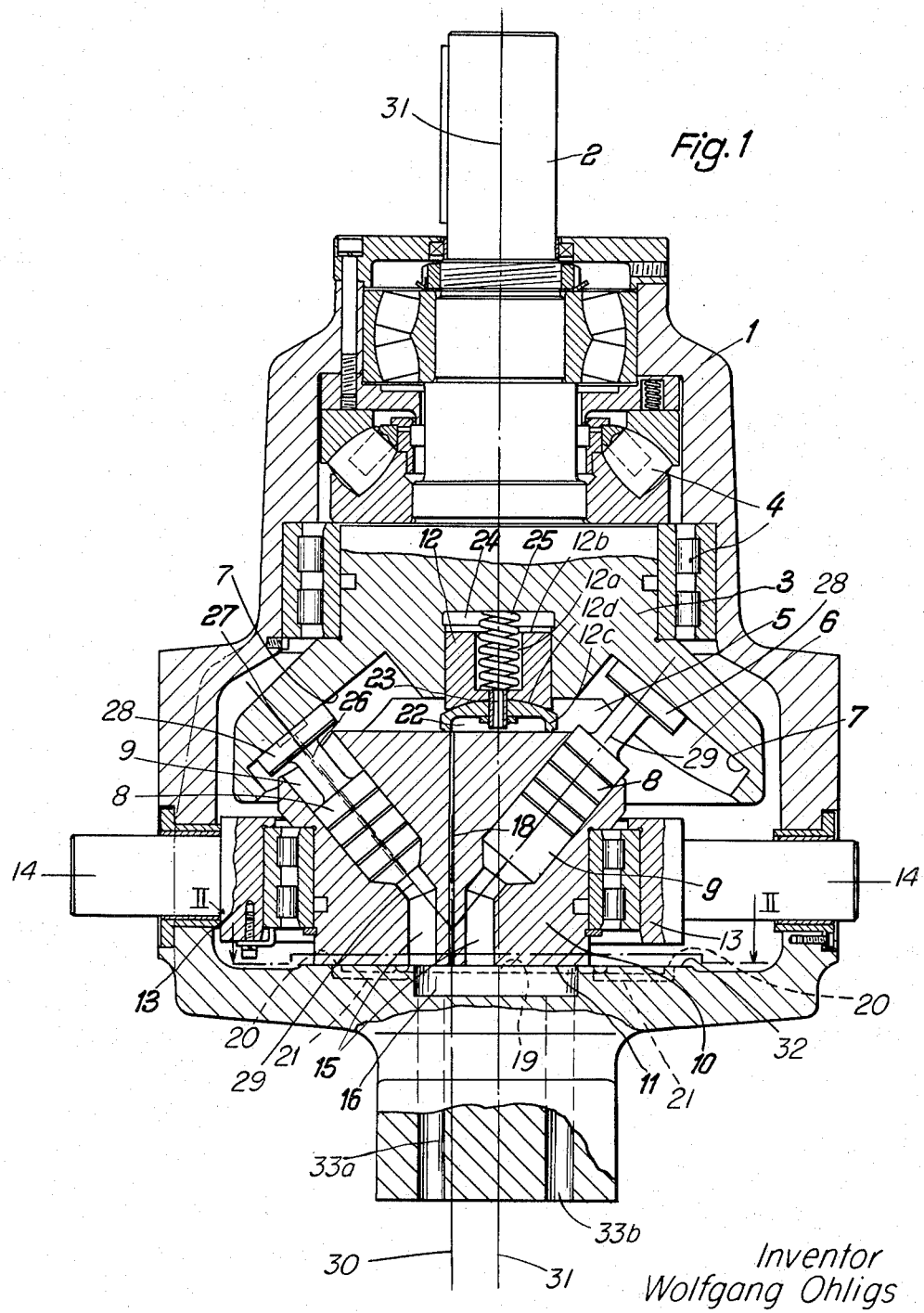
FIG. 1 is a view in vertical section of a first embodiment of the invention in which the cylinder block is shiftable laterally and the housing is fastened to a drive shaft in a fixed location.

Referring to FIG. 1, an apparatus according to the first embodiment of the invention comprises a casing 1, a drive shaft 2 mounted rotatably in the casing and a cylinder block 10 mounted inside the casing. The block 10 has a control surface 11 which is adapted to slide on a main control surface 32, which is part of the casing 1. The cylinder block 10 contains cylinders 9 and pistons 8 inside the cylinders. The pistons 8 have piston heads 28 affixed to them, the piston heads 28 being larger than their associated pistons 8. Each piston 8, piston head 28 and cylinder 9 have a common central axis 29, and these axes 29 are in array which defines a cone. The vertex of this cone lies at a point on a central axis 30 which is shared by both the cone and the cylinder block 10. As shown in FIG. 1, the axis 30 of the block 10 is eccentric with respect to a central axis 31 of the drive shaft 2 and the housing 3.

Connected to the shaft 2 inside the casing 1 and coaxial with the shaft is a housing 3 rotatably mounted in the casing 1 by means of bearings 4. Housing 3 has a cavity 5 shaped to define, generally, the frustum of a cone. Flat circular inner walls 7 are recessed into the housing from the cavity 5 by a milling or boring process. Piston heads 28 are adapted to contact and slide on inner walls 7 which are larger than the piston heads 28 thus permitting sliding. Both the walls 7 and piston heads 28 are perpendicular to the aforementioned piston axes 29. The large size of piston heads 28 and inner walls 7 provides a large area abutment for the piston heads 28 thereby freeing the pistons from non-axial tilting pressures.

It has been noted that the block 10 is slidable on main control surface 32 of the casing 1. More particularly, block 10 is rotatably mounted in an adjusting mechanism 13. This adjusting mechanism 13 has adjusting rods 14 which project to the exterior of the casing 1 and are adapted to move the mechanism 13 and block 10 laterally across main control surface 32 of the casing 1. This movement adjusts the eccentricity of axis 30 of the cylinder block 10 (and the cone defined by the cylinder axes 29) with respect to axis 31 of the drive shaft 2 and housing 3, thereby adjusting the stroke of the pistons 8.

The block 10 has a conduit 18 along its central axis 30, and cylinder conduits 15 leading from the cylinders 9. Both conduit 18 and conduits 15 exit through the control surface 11 in the block 10. Conduct 18 is adapted to transmit fluid pressure from fluid films forming between the surfaces 11 and 32. Cylinder conduits 15 are adapted to accept and transmit fluid under pressure to and from cylinders 9. The function and operation of conduit 18 and conduits 15 will be described in more detail below.

Housing 3 is provided with a central recess 24 in which there is positioned a bearing 12. The bearing 12 has a socket 12a in which is seated a spring 25, which extends beyond the rear face 12b of the bearing 12 and abuts the end of the recess 24 urging the bearing 12 toward block 10. A cup 12c defining a chamber 22 is fixed to the forward end 12d of the bearing 12 and abuts against the block 10. A conduit 23 connects the chamber 22 with the socket 12a and thus with the recess 24. The cup 12c is of such size that chamber 22 is always connected with the conduit 18 of the block 10.

Figure 2:
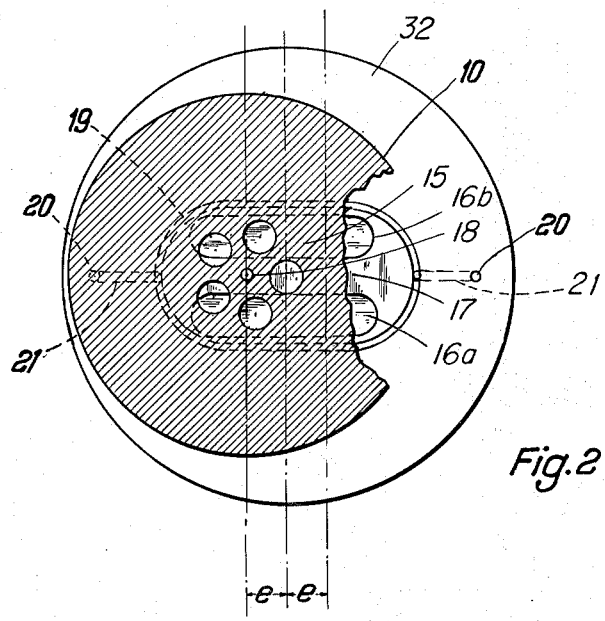
FIG. 2 is a section taken on line II—II of FIG. 1. It shows a control surface of the embodiment of FIG. 1 with the cylinder block positioned above it.

Referring now to FIG. 2, the main control surface 32 have two elongated valves ports 16a, 16b separated by a bridge 17.

Each of the valve ports 16a, 16b is advantageously of the same width as the diameter of cylinder conduits 15 and is connected to one of two conduits 33a, 33b in the casing. One of these conduits, e.g., 33a is a high-pressure conduit and the other, e.g., 33b a low-pressure conduit. Conduits 33 are also advantageously made the same diameter as the conduits 15 in block 10. The figure also shows five conduits 15, the right-hand one of which corresponds to the dead center of the piston stroke. It is shown situated right on the bridge 17. The conduit 18 opens on the bridge. Conduit 18 is shown situated at the maximum possible displacement a distance e to the left of the middle of bridge 17. Movement of block 10 by adjusting mechanism 13 causes conduit 18 to slide laterally along the center of bridge 17. Surrounding the valve ports 16 in the main control surface 32 there is a groove 19. Groove 19 is connected via conduits 21 which have exits 20 at separated points in the casing 1, to the interior of the casing. Exits 20 are so spaced that at least one of them is always outside control surface 11 of the block 10 no matter where the block is positioned by the adjusting mechanism 13.

Now, referring to FIGS. 1 and 2 together the operation and function of the device can be appreciated more clearly.

Assume that the device is to operate as a pump. In this case torque will be applied to the shaft 2, by means not shown and the shaft 2 and housing 3 attached thereto will rotate. Due to the frictional engagement of piston heads 28 against the surfaces 7 of the housing the block 10 will also rotate. However, because of the eccentricity between the axis of the housing and the axis of the block, the pistons on the left side as shown in FIG. 1 will be forced into cylinders 9 with the piston heads 28 sliding radially outwardly on the surfaces 7. Fluid in the cylinders will thereby be forced through conduits 15. As the cylinder block 10 rotates the conduits 15 pass over valve ports 16a, 16b. Thus for example in FIG. 1 the left hand conduit 15 may be assumed to be over ports 16a, and thus fluid is delivered under pressure to conduit 33a. At the same time the right hand cylinder is at the top of its stroke so that fluid is entering this cylinder.

When the device is to be used as a motor, the opposite sequence applies, i.e. fluid under pressure is furnished to the left side of the device, i.e. through conduit 33a and flows through port 16a to the left hand cylinder (as the device appears in FIG. 1) causing axial movement of the pistons and rotation of the housing 3 and shaft 2 to compensate therefor.

If it is desired to change the stroke of the pistons in block 10, the left hand rod 14 (in FIG. 1) may be pushed in, thus moving the block to the right in FIG. 1.

During operation of the device there may be an increase in pressure of a fluid film between control surface 32 and control surface 11 due to fluid pressures in one of the conduits 15 and 33 or valve ports 16. Unless equalized somehow such a pressure increase will increase fluid film thickness between those surfaces and decrease such film thickness between other surfaces, in the device, moving relatively to one another. In accordance with the invention, such pressure increases are equalized in two ways. First, any increase in pressure forming between bridge 17 and control surface 11 is transmitted by conduit 18, chamber 22, and conduit 23 to the recess 24 in housing 3. With the pressure increase thus transmitted, pressures on the bearing and control surface sides of the block 10 are equalized thus ensuring that the block 10 floats evenly between the housing 3 and the casing 1. Secondly, any increase in pressure forming around the valve ports 16 and between control surfaces 32 and 11 is transmitted via groove 19, and one or more conduits 21 to the interior of casing 1. These pressure equalizing means taken together automatically control the thickness of such fluid films as may form between surfaces 11 and 32. It should furthermore be noted that, in accordance with known practice there are provided in the pistons 8, conduits 26, that run from the rear end of the pistons to recesses 27 in the flat end faces of the piston heads 28. All these pressure equalizing means in combination enable the cylinder block 10 to float evenly between housing 3 and control surface 32 of the casing 1.

For this evenly floating installation of the cylinder block 10 it is immaterial whether the bearing 12 is disposed in a recess in the housing 3 and bears against the cylinder block 10, or whether the recess is arranged in the cylinder block 10 and the bearing 12 bears against a surface of housing 3. This reversed design is not illustrated, because such a reversal is self-evident to anyone skilled in the art. It should also be noted that the operative fluid can be used as the pressure fluid; but it is also possible to supply fluid under pressure from a special source.

Figure 3:
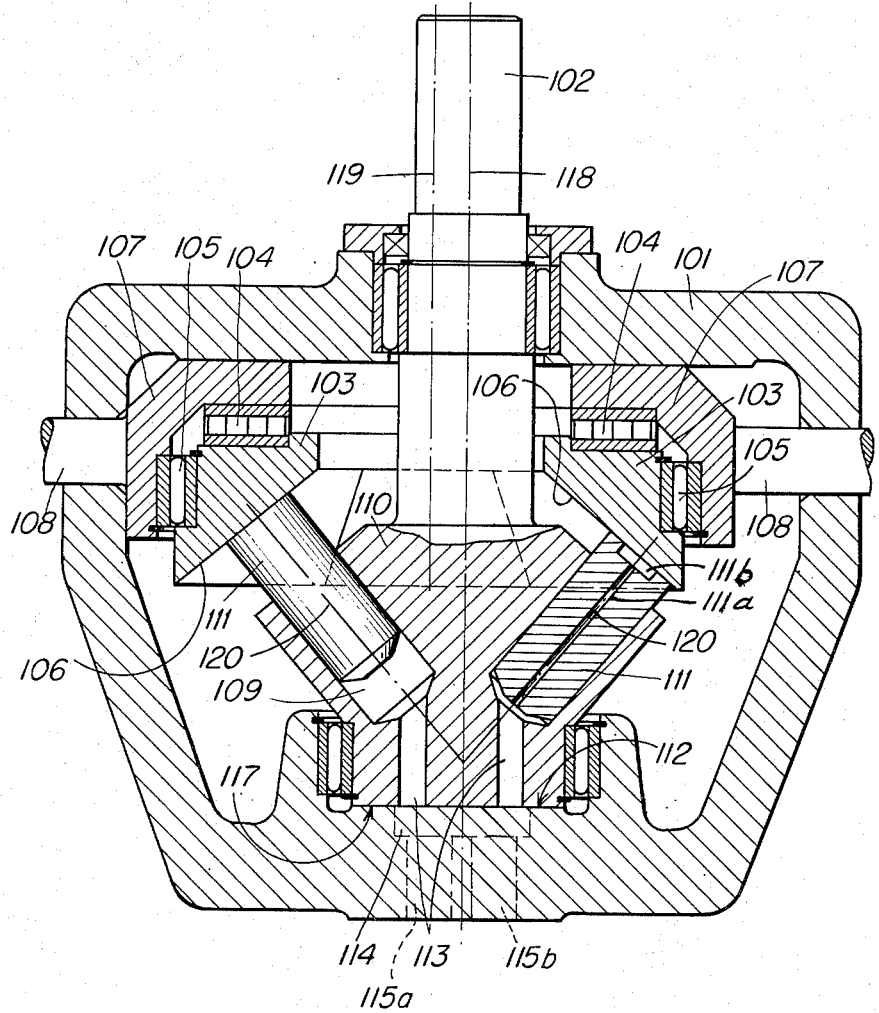
FIG. 3 is a vertical section through a second form of construction of the device in which the housing can be shifted laterally, the cylinder block being fastened to the drive shaft.

Referring to FIG. 3, an apparatus according to the second form of construction of the invention comprises a casing 101 in which a driveshaft 102 is rotatably mounted. The driveshaft 102 is connected to a cylinder block 110 having cylinders 109, pistons 111, cylinder conduits 113 and a control surface 117. A main control surface 112 is part of casing 101 and abuts control surface 117. Valve ports 114 are also part of the casing 101. Inflow/outflow conduits 115a and 115b are connected in the casing to the valve ports 114. A housing 103 is mounted rotatably inside casing 101 in an adjusting mechanism 107, having adjusting rods 108.

Figure 4:
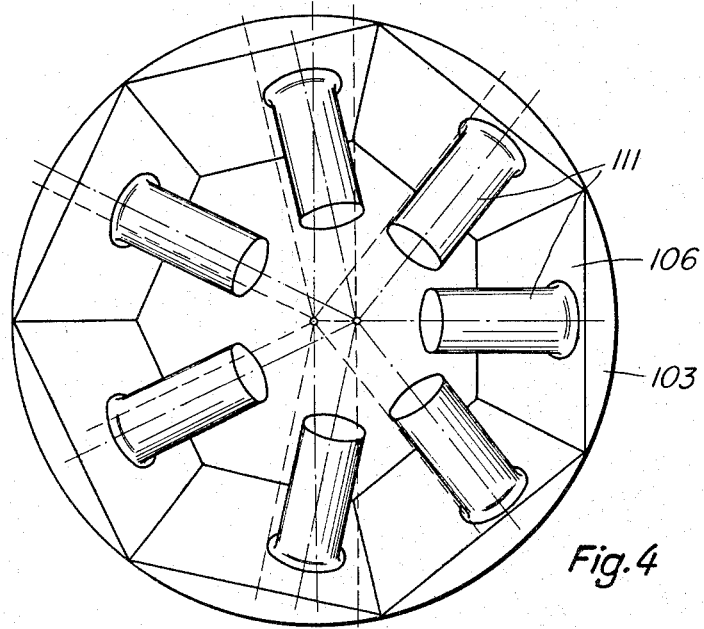
FIG. 4 is a schematic view of the inside of the housing in which the generally conical pattern of its inner walls more specifically defines the frustum of a pyramid. The pistons that slide with their heads against these flat surfaces are also shown schematically.

The housing 103 has a cavity formed by flat inner walls 106. As shown more clearly in FIG. 4, the inner walls define the frustum of a pyramid.

As shown in FIG. 3, the housing 103 is positioned eccentrically with respect to block 110, and this eccentricity may be adjusted by movement of the adjusting mechanism 107.

In the form of construction shown in FIG. 3, the cylinder block 110 fixed to shaft 102 is rotatable in a fixed position in the casing 101. And as stated the housing 103 can be shifted laterally by the adjusting mechanism 107 and adjusting rods 108 which project to the exterior of the casing 101. This construction is made possible by using axial-thrust bearings 104 and radial-thrust bearings 105 in the adjusting mechanism 107 to care for reaction forces on housing 103 which develop during operation of the device. As shown in FIG. 3, the inner walls 106 of the housing 103 are flat and not bored or milled in cylindrical recesses as they are in the embodiment of FIG. 1.

Pistons 111 have pressure equalizing conduits 111a and recesses 111b similar to those described in connection with the construction of FIGS. 1 and 2. These conduits 111a and recesses 111b enable the block 110 to float evenly between control surface 112 and the housing 103.

Operation of this form of construction of the invention is similar to that of the first construction but the block 110 remains in a fixed position with the housing 103 moveable laterally. Thus when the device is used as a pump, rotation of the drive shaft 102 by means not shown causes the cylinder block 110 to rotate. Through rotation of the block 110 the pistons 111 cause the housing 103 to rotate and with the housing 103 and cylinder block 110 rotating together the pistons 111 perform a pumping action on the fluid. The setting of the adjusting mechanism 113 determines the length of the pumping stroke.

If the device is to be used as a drive, incoming fluid admitted through one valve port 114 pushes the pistons one after another against the housing. This push has components of force which rotate the block 110 and housing 103 and thus drive shaft 102.

While novel features of the invention have been shown and described and pointed out, it will be understood that various omissions and substitutions and changes in the form and details of the device illustrated may be made by those skilled in the art without departing from the spirit of the invention. It is intended therefore that the invention be limited only as indicated by the scope of the following claims.

What is claimed is:

1. A fluid drive means suitable for use as a fluid motor and as a fluid pump, comprising a housing and a block each having a central axis, said housing having a central cavity with inner walls, said cavity and walls defining in general the frustum of a pyramid, said block being positioned adjacent to said cavity and having a plurality of cylinders formed therein, each of said cylinders having a longitudinal axis substantially perpendicular to the inner wall of said cavity, a piston in each of said cylinders, each of said pistons having a head with a flat bearing surface adapted to contact the inner wall of said cavity associated with it, the axes of said housing and said block being offset with respect to one another, a casing enclosing said housing and said block, means comprising a drive shaft mounted in said casing and secured to said housing, for rotating said housing and said block about their central axes, a control surface in said casing, said surface having a plurality of ports separated by a bridge, and adjusting means for causing relative movement between said housing and said block in a direction perpendicular to their central axes, said block being rotatably mounted in said adjusting means and movable along said bridge by said adjusting means.

2. A fluid drive means suitable for use as a fluid motor and as a fluid pump comprising a housing and a block, each having a central axis, said housing having a central cavity with inner walls, said cavity and walls defining in general the frustrum of a pyramid, said block being positioned adjacent to said cavity and having a plurality of cylinders formed therein, each of said cylinders having a longitudinal axis substantially perpendicular to an inner wall of said cavity, a piston in each of said cylinders, each of said pistons having a head with a flat bearing surface adapted to contact the inner wall of said cavity associated with it, the axes of said housing and said block being offset with respect to one another, means for rotating said housing and said block about their central axes and adjusting means for causing relative movement between the housing and the block in a direction perpendicular to their central axes, in combination with a bearing located between said block and said housing and capable of limited movement in a direction parallel to the axes of said block and housing and means capable of delivering fluid under pressure to said bearing to effect movement thereof.

3. A fluid pump or motor in accordance with claim 2, characterized in that the bearing is positioned in a recess in the housing.

4. A fluid pump or motor in accordance with claim 2, characterized in that the bearing is positioned in a recess in the cylinder block.

5. A fluid drive means for use as a fluid motor and as a fluid pump comprising a housing and a block each having a central axis, said housing having a central cavity with inner walls, said cavity and walls defining in general the frustrum of a pyramid, said block being positioned adjacent to said cavity and having a plurality of cylinders formed therein, each of said cylinders having a longitudinal axis substantially perpendicular to an inner wall of said cavity, a piston in each of said cylinders, each of said pistons having a head with a flat bearing surface adapted to contact the inner wall of said cavity associated with it, the axes of said housing and said block being offset with respect to one another, means for rotating said housing and said block about their central axes, a casing enclosing said housing and said block, a bearing located between said block and said housing and capable of limited movement in a direction parallel to the axes of said block and said housing, a main control surface in said casing having a high pressure port and a low pressure port separated by a bridge, said block having a control surface abutting said main control surface, being movable along said bridge and having a passage extending along the central axis from said control surface to said bearing, and adjusting means for causing relative movement between the housing and the block in a direction perpendicular to their central axes.

6. A fluid drive means suitable for use as a fluid motor and as a fluid pump, said drive means using a fluid under pressure and having a casing and a rotating cylinder block inside the casing with cylinders and regulatable-stroke pistons adapted to reciprocate therein, each piston having a flat head perpendicular to its stroke and a central axis, the improvement comprising the combination of;

a flat upper bearing surface and a flat control surface on said block, the cylinders and the central axes of the pistons in the block being arranged in an array defining a cone, whose vertex points toward said flat control surface and lies at a point on an axis through the center of the block, a hollow rotating circular element having a central axis and flat inner slide surfaces, there being one such surface associated with each piston head, each such surface being parallel to its associated piston head, and each piston head being adapted to contact and slide on its associated slide surface, a drive shaft mounted in a fixed location in the casing, the drive shaft being connected to said hollow rotating circular element for rotating, the contact of each piston head with its associated slide surface ensuring rotation of the cylinder block whenever the hollow circular element is rotated, a flat control surface in the casing on which the flat control surface of the rotating cylinder block abuts, the control surface having at least two valve ports and a web, having a centerline, between them, an adjusting mechanism for moving the cylinder block along the centerline of the web between the valve ports in the control surface thereby changing the eccentricity of the vertical axis of said block with respect to said hollow rotating circular element and adjusting the stroke of the pistons, and conduit and groove means for controlling the pressure of the fluid between the housing, the cylinder block and the hollow circular element.

7. The improvement in fluid drive means according to claim 6, further characterized in that the conduit and groove means comprise a groove in the housing control surface surrounding the valve ports, there being also at least two conduits connected to the groove with exits at two separated points inside the housing, these exits being so spaced that no more than one of them at a time is ever closed off by the control surface of the cylinder block, thereby reducing the pressure of fluid films forming between the cylinder block and the control surface.

References Cited by the Examiner
UNITED STATES PATENTS 2,069,651  2/37  Ferris _____ 103—162
2,721,519  10/55  Henrichsen _____ 103—162

FOREIGN PATENTS 163,353  6/49  Austria.

LAURENCE V. EFNER, *Primary Examiner.*

JOSEPH H. BRANSON, JR., *Examiner.*